US007027917B2

(12) United States Patent
Ikeda

(10) Patent No.: US 7,027,917 B2
(45) Date of Patent: Apr. 11, 2006

(54) INFORMATION DISPLAY APPARATUS AND INFORMATION DISPLAY METHOD

(75) Inventor: Atsushi Ikeda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 199 days.

(21) Appl. No.: 10/667,599

(22) Filed: Sep. 23, 2003

(65) Prior Publication Data

US 2004/0059501 A1 Mar. 25, 2004

(30) Foreign Application Priority Data

Sep. 24, 2002 (JP) ............................ 2002-277706

(51) Int. Cl.
*G01C 21/30* (2006.01)
*G01C 21/32* (2006.01)

(52) U.S. Cl. ....................... 701/211; 701/117; 701/207; 701/212; 701/118; 701/200; 340/993; 340/995.2; 340/435; 340/436; 340/905; 340/990; 382/166; 382/176; 382/232; 382/282

(58) Field of Classification Search ................ 701/117, 701/207, 211–212, 36, 118, 200; 340/993, 340/435–436, 995.2, 905, 990, 995.14, 539.1, 340/934, 937, 995.15, 995.17; 455/456.6; 104/88.01, 88.02, 292, 288; 707/104.1; 382/166, 382/173, 232, 282

See application file for complete search history.

(56) References Cited

U.S. PATENT DOCUMENTS 5,084,822 A * 1/1992 Hayami ...................... 701/212
5,283,573 A * 2/1994 Takatou et al. ............. 340/937
5,530,441 A * 6/1996 Takatou et al. ............. 340/937
5,583,494 A * 12/1996 Mizutani et al. ....... 340/995.14
6,129,025 A * 10/2000 Minakami et al. ....... 104/88.01
6,255,963 B1 * 7/2001 Heimann et al. ........... 340/905
6,260,859 B1 * 7/2001 Dixon et al. ............. 280/5.514
6,560,533 B1 * 5/2003 Sugawara et al. .......... 701/211
6,836,564 B1 * 12/2004 Katayama et al. .......... 382/166
2001/0036308 A1 * 11/2001 Katayama et al. .......... 382/166

(Continued)

FOREIGN PATENT DOCUMENTS

DE 198 52 237 A 1 5/2000

(Continued)

OTHER PUBLICATIONS

Gravila et al., Real-time vision for intelligent vehicles, 2001, IEEE, p. 22-27.*

(Continued)

*Primary Examiner*—Thomas G. Black
*Assistant Examiner*—McDieunel Marc
(74) *Attorney, Agent, or Firm*—McGinn IP Law Group, PLLC

(57) ABSTRACT

To perform provision of information which allows a driver to generally know events which a vehicle is about to reach, and which calls the driver's attention to the events. A computer 14 controls a display apparatus 16 so as to display symbols, which corresponding to all events existing between a position of a vehicle and an end position of a service section, among events existing in the service section as first display object symbols in a first display area. In addition, the computer 14 controls the display apparatus 16 so as to display, synchronizing timing with the vehicle reaching a position corresponding to the calculated display timing, symbols corresponding to the display timing as second display object symbols in a second display area in a display size larger than a display size of the first display object symbols.

13 Claims, 9 Drawing Sheets

U.S. PATENT DOCUMENTS

| | | | | |
|---|---|---|---|---|
| 2001/0041962 | A1* | 11/2001 | Sugawara et al. | 701/211 |
| 2002/0063639 | A1* | 5/2002 | Matsunaga | 340/933 |
| 2003/0023614 | A1* | 1/2003 | Newstrom et al. | 707/104.1 |

FOREIGN PATENT DOCUMENTS

| | | |
|---|---|---|
| DE | 101 19 730 A 1 | 11/2002 |
| EP | 0 829 839 A1 | 3/1998 |
| JP | 2000-258177 | 9/2000 |
| JP | 2001-101593 | 4/2001 |
| JP | 2001-101594 | 4/2001 |

OTHER PUBLICATIONS

Hall et al., A novel interactivity environment for integrated intelligent transporatation adn telematic system, 2002, IEEE, p. 396-401.*

European Search Report dated Jan. 2, 2004.

* cited by examiner

FIG.3
LEFT CURVE(90°)
RIGHT CURVE(90°)
LEFT CURVE(180°)
RIGHT CURVE(180°)
LEFT CURVE(270°)
RIGHT CURVE(270°)
TRAFFIC JAM
MISCELLANEOUS
SLIPPERY WHEN FROZEN · LOW μ
SNOW·SNOWFALL
FROZEN
SNOW
FROZEN
SNOW
ROAD SURFACE WET
ROAD SURFACE MOISTURE (DAMP)
STOPPED VEHICLE
CROSSING
WET
MOISTURE
SIDE ROAD MERGES FROM THE LEFT
SIDE ROAD MERGES FROM THE RIGHT
SIDE ROAD JOINS FROM THE LEFT
SIDE ROAD JOINS FROM THE RIGHT

INFORMATION DISPLAY APPARATUS AND INFORMATION DISPLAY METHOD

BACKGROUND OF THE INVENTION

1. Field of the Invention

The present invention relates to an on-vehicle apparatus for receiving service information sent from a road infrastructure to perform cruise assist as a driving support system, and in particular to an information display system and an information display method for displaying received service information.

2. Description of the Related Art

In recent years, as a technology for traffic-safety utilizing an information communication technique, the ITS (Intelligent Transport System) has been developed. As one kind of this ITS, there is the AHS (Advanced Cruise-Assist Highway System). In this AHS, a system on a road side (road infrastructure) and an on-vehicle apparatus on a vehicle side communicate with each other, whereby the road and the vehicle unite to perform cruise assist.

One form of cruise assist is provision of information, and information concerning events (e.g., curves, stopped vehicles, crossings, etc.) existing in a service section on a road is provided to crew members (in particular, a driver) of a vehicle. In the AHS, although contents of the information sent from the road infrastructure to the on-vehicle apparatus are decided as a standard, it is left to the autonomy of a manufacturer how the contents of the information received by the on-vehicle apparatus are provided to the driver. As a method of provision of information to the driver, for example, there is display of information using a display apparatus provided in the vehicle (e.g., see the following Patent Documents 1 and 2). In such a method, it displays a symbol corresponding to an event which the vehicle is about to reach (or characters or the like corresponding to content of such a event) based upon the information received from the road infrastructure, whereby the driver is provided with the information.

[Patent Document 1]

JP-A-2001-101593

[Patent Document 2]

JP-A-2001-101594

In such a display apparatus, from the viewpoint of provision of information to a driver, its significance is attained by displaying a symbol corresponding only to a closest event which a vehicle is about to reach. However, from the stand point of the driver who is provided with the information, the information is likely to be insufficient through such a method of display of information. In order to drive comfortably, it is desirable for the driver to generally know what kinds of events exist on a road which the driver's own vehicle is about to reach. This is because, comparing a state in which the driver generally knows events on a road which the driver's own vehicle is about to reach with a state in which the driver knows the events on the road only partially, the former state gives less mental burden to the driver in terms of guaranteeing predictability. In addition, in terms of provision of information as cruise assist, this provision of information has an implication of drawing the driver's attention to an event. Therefore, in the case in which information is provided to the driver, it is also important to perform at least display of information considering calling the driver's attention.

SUMMARY OF THE INVENTION

The present invention has been devised in view of such circumstances, and it is an object of the present invention to perform provision of information which allows a driver to generally know events which a vehicle is about to reach, and which calls the driver's attention to the events.

In order to solve such a problem, a first invention provides an information display system which displays service information concerning to at least one of events existing in a service section set for a road received from a road infrastructure. This system has a communication apparatus, a computer, and a display apparatus. The communication apparatus receives the service information transmitted from the road infrastructure. The computer determines at least one of symbols based upon the received service information. The computer also controls a display position and display timing for the determined symbol. Each symbol corresponds to each the event which exists in the service section. The display apparatus displays the determined symbol in response to an output from the computer. The computer controls the display apparatus so as to display all of the events existing between a position of a vehicle and an end position of the service section by first display object symbols in a first display area. The computer calculates the display timing based on the position and the contents for each of the events existing in the service section. The computer also controls the display apparatus so as to display a second display object symbol having a display size larger than that of the first display object symbols in a second display area different from the first display area. The symbol as the second display object symbol is displayed when the vehicle reaches to a position corresponding to the calculated display timing for each of the events.

A second invention provides an information display system which displays service information concerning to at least one of events existing in a service section set for a road received from a road infrastructure. This system has a communication apparatus, a computer, and a display apparatus. The communication apparatus receives the service information transmitted from the road infrastructure. The computer for determines at least one of symbols based upon the received service information. Each symbol corresponds to each event existing in the service section. The computer also controls a display position and display timing for the determined symbol. The display apparatus displays the determined symbol in response to an output from the computer. The computer controls the display apparatus so as to display first display object symbols in a first display area. The first display object symbols includes the symbols corresponding to all of the events existing between a position of a vehicle and an end position of the service section. The computer calculates the display timing based on the position and the contents for each the event existing in the service section. The computer controls the display apparatus so as to hierarchically display a predetermined number of events in an order of earliness of the display timing in the second display area.

A third invention provides an information display method which displays service information for at least one of events existing in a service section set for a road received from a road infrastructure. This method has three steps, that is, a first step of displaying all of the events existing between a position of a vehicle and an end position of the service section, a second step of calculating display timing for displaying at least one of symbols in a second display area different from the first display area based upon the position and the contents for each of the events existing in the service section, each symbol corresponding to each the event, and a third step of displaying the determined symbol corresponding to the display timing as second display object symbol having a display size larger than that of the first display object symbol in the second display area, when the vehicle reaches to a position corresponding to the calculated display timing for each of the events.

BRIEF DESCRIPTION OF THE DRAEINGS

DESCRIPTION OF PREFERRED EMBODIMENT

Figure 1:
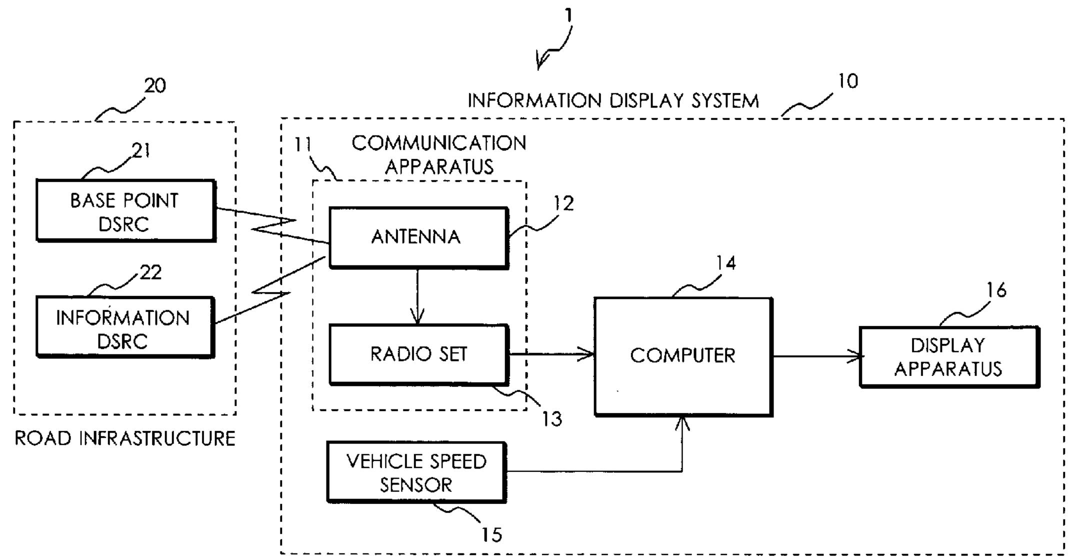
FIG. 1 is a block diagram showing an overall structure of a cruise assist system to which an information display system in accordance with this embodiment is applied.

FIG. 1 is a block diagram showing an overall structure of a cruise assist system with an information display system in accordance with this embodiment is applied. In this embodiment, this cruise assist system 1 is, as an example, an AHS, and comprises an information display system 10 functioning as an on-vehicle apparatus on a vehicle and a road infrastructure 20. In this AHS 1, the information display system 10 and the road infrastructure 20 communicate with each other, whereby predetermined cruise assist (service) is performed. Services performed by this AHS 1 basically include curve approach danger prevention assist, collision upon-meeting-suddenly prevention assist, right turn collision prevention assist, crosswalk pedestrian collision prevention assist, provision of road surface information, and provision of information on vehicle stopped in front/low speed vehicle. There are three levels of provision of information, alarm, and operation assist in the AHS 1 as an assist level for performing such services (level of a function with an aim of assisting a crew member with driving). A service premised on provision of information will be described in this embodiment. Therefore, the information display system 10 and the road infrastructure 20 communicate with each other, whereby information on events existing on a road is sent from the road infrastructure 20 to the information display system 10 on the vehicle side.

Here, first, the road infrastructure 20 of the AHS 1 will be described. The road infrastructure 20 is constituted mainly by DSRC (Dedicated Short Range Communication) arranged continuously or discretely. This DSRC performs transmission of information from the road infrastructure 20 to the information display system 10 by performing spot communication using, for example, th radio frequency 5.8 GHz band. In one service section, this DSRC includes a combination of a base point DSRC 21 and an information DSRC 22, and information on this service section is sent from the base point DSRC 21 and the information DSRC 22. Here, the service section means a section which is set on a road and in which services are provided. In this embodiment, it means a section from a position of the base point DSRC 21 to an end position of the service section included in information transmitted by the information DSRC 22. Note that, in this embodiment, description will be made assuming a complex service in which a plurality of events (in this embodiment, five events as an example) are included in the service section.

Figure 2:
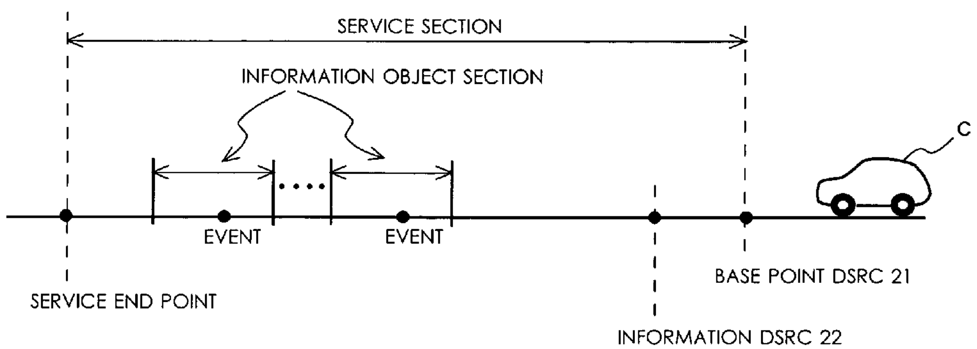
FIG. 2 is an explanatory diagram showing a service section.

FIG. 2 is an explanatory diagram showing a service section. The base point DSRC 21 is mainly a DSRC functioning as a positional base point of the service section and sends system information and service control information. The system information includes an ID of the DSRC, which has sent of the system information and the service control information, and a classification on whether this DSRC is a base DSRC or an information DSRC. In addition, the service control information includes an ID of an information DSRC providing services in combination with this base point DSRC 21 and a frequency used by this information DSRC.

The information DSRC 22 is mainly a DSRC which executes services, that is, sends information on events existing in a service section to a vehicle side. The information DSRC 22 sends system information, service control information, service state information, service end point information, and individual service information. The system information includes an ID of the DSRC which has sent these pieces of information, a classification on whether this DSRC is a base point DSRC or an information DSRC, and a date and time. The service control information includes an ID of the base point DSRC to be combined with this information DSRC 22 (in this embodiment, the base point DSRC 21), a frequency to be used by this information DSRC 22, and the like. In addition, the service state information includes types of services to be communicated by the information DSRC 22 and a state of operation or non-operation of these services. The service end point information includes an end position of a service section. This end position is a path distance to a certain point which is defined on the basis of a position of the base point DSRC 21 to be combined with this information DSRC 22. In addition, the individual service information includes information necessary for each service. For example, a position of an event, content of the event, a position of an information object section in which the event is included, a road surface state of this information object section, and the like are included in this individual service section. Note that, in this specification, judging from a characteristic of information to be sent from the information DSRC 22, this information to be sent from the information DSRC 22 is referred to as service information for convenience's sake. However, from the viewpoint of realization of this service, information to be sent from the base point DSRC 21 can also be included in this service information in a broad sense.

The information to be sent by the base point DSRC 21 and the information DSRC 22 is managed unitarily by a base station (not shown) provided on these DSRCs 21, 22 side. In this base station, events existing in a service section (more precisely, information object section in which these events are included) are monitored, and preparation and update of service information are performed. Therefore, information according to a state of a present service section is reflected on service information to be sent from this base station side via the information DSRC 22.

With reference to FIG. 1 again, an information provision system 10, which is an on-vehicle apparatus, will be described. This information provision system 10 has a communication apparatus 11, a computer 14, and a display apparatus 16 and uses received service information to provide (display) information equivalent to service information to crew members of a vehicle C.

The communication apparatus 11 comprises an antenna 12 and a radio set 13 and performs wireless communication with the base point DSRC 21 or the information DSRC 22. The antenna 12, which receives a radio wave (service information) of a predetermined frequency sent from the DSRC, is provided, for example, on a dashboard. The service information received by this antenna 12 is outputted to the radio set 13, and the radio set 13 extracts the service information from a carrier wave using a predetermined decoding system. Then, this extracted service information is outputted to the computer 14.

Figure 3:
FIG. 3 is an explanatory diagram showing an example of association between contents of events and symbols.

A microcomputer functioning as the computer 14 comprises a CPU, a ROM, a RAM, an input/output interface, and the like. In a relation with this embodiment, the computer 14 determines symbols corresponding to events existing in a service section based upon service information, and it controls a position and timing for displaying the determined symbols on the display apparatus 16. Symbols corresponding to events as shown in FIG. 3 are stored in the ROM of the microcomputer, for example, in the form of bit-map data. Here, FIG. 3 is an explanatory diagram showing an example of correspondence between contents of events and symbols. In addition, vehicle information on the vehicle C including a vehicle speed obtained from a vehicle speed sensor 15 or the like is inputted in the computer 14 via the input/output interface. The computer 14 can recognize a position of the vehicle C in the service section based upon this vehicle information and a position of the base point DSRC 21.

The display apparatus 16 is disposed, for example, in apart of the dashboard, and a display state thereof is controlled by the computer 14. That is, in this embodiment, symbols corresponding to events are displayed on this display apparatus 16, and information is provided to a driver by this display of the symbols. However, this display apparatus 16 is not limited to functioning only as symbol display but, for example, may selectively display navigation information or the like using the GPS.

A display state controlled by the computer 14 will be described in association with advance of the vehicle C in the service section. First, when the vehicle C passes a radio zone formed by the base point DSRC 21, information sent from the base point DSRC 21 is received via the antenna 12. The received information is outputted to the computer 14 through the radio set 13. The computer 14 specifies that this information is information sent from the base point DSRC 21 based upon the inputted information, and stores an ID of this base point DSRC 21.

Next, when the vehicle C passes a radio zone formed by the information DSRC 22, service information sent from the information DSRC 22 is received via the antenna 12. The received service information is outputted to the computer 14 through the radio set 13. Relying on the stored ID of the base point DSRC 21, the computer 14 specifies the base point DSRC 21 to be combined with this information DSRC 22 based upon the inputted service information (more precisely, based upon the ID of the base point DSRC). Then, the computer 14 determines a position of the specified base point DSRC 21 as a base point position to be a base point of a distance in the service section. In this case, the computer 14 can specify a position of this base point DSRC 21 by calculating relative positions of the specified base point DSRC 21 and the vehicle C (i.e., path distance from the base point DSRC 21 to the vehicle C) based upon vehicle information including at least a vehicle speed. Therefore, the computer 14 recognizes its position in the service section with this base point position as a reference. Moreover, based on the inputted service information, the computer 14 acquires positions of events, contents of events, a position of an information object section in which the events are included, and a road surface state in the information object section.

Upon receiving the service information from the information DSRC 22, the computer 14 specifies symbols, which corresponds to all events existing between a position of the vehicle C in the service section and an end position of the service section among the events existing in the service section, as first display object symbols. Then, the computer 14 controls the display apparatus 16 so as to display this first display object symbols in a first display area. In addition, the computer 14 controls the display apparatus 16 so as to display symbols corresponding to events as first display object symbols in the first display area until the vehicle C passes the events. Therefore, in a state in which the vehicle C has not passed an event in the service section at all, these first display object symbols become respective symbols corresponding to all the events included in the service information.

Note that, in this case, the computer 14 desirably controls the display apparatus 16 so as to display an array of the first display object symbols linearly. By displaying the array of the first display object symbols in this way, since the symbols to be displayed can show a sense of stability of a figurative layout, the cruise assist system has an advantage that it is excellent in viewability for a driver.

Figure 4:
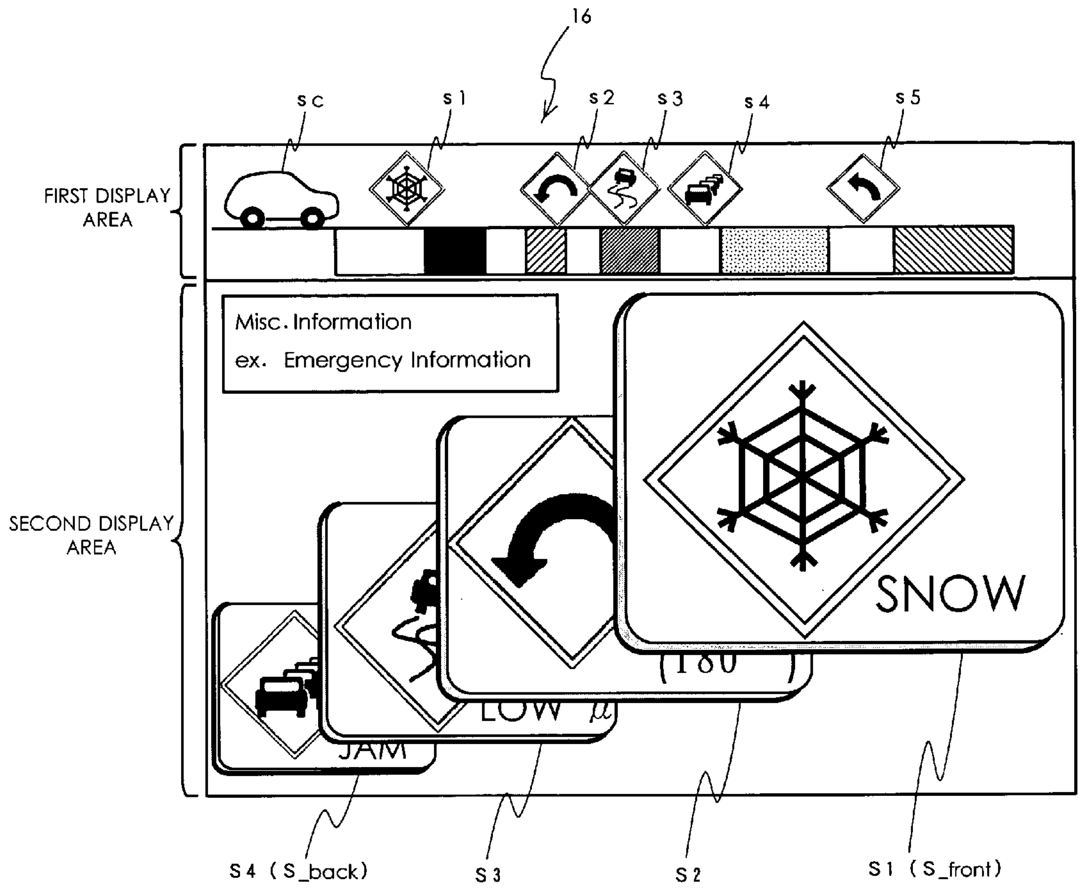
FIG. 4 is an explanatory diagram showing an example of a state in which symbols are displayed in a display apparatus.

Here, a control state of the computer 14 concerning the first display area will be described in association with a display state of the display apparatus 16. FIG. 4 is an explanatory diagram showing an example of a state in which symbols are displayed on the display apparatus 16. As shown in the figure, in this embodiment, the first display area is specified in a part on the upper side of the display apparatus 16 (e.g., about ⅓ of the entire display apparatus 16), and the first display object symbols are displayed in this first display area. In the example shown in the figure, a symbol sc indicating the vehicle C is displayed on the left side in the figure as a first display object symbol, and symbols s1 to s5 corresponding to events included in service information are displayed on the right side of this symbol sc (traveling direction of the vehicle C), respectively. In this case, a positional relation (more specifically, positional relation in the lateral direction) among the respective symbols sc and s1 to s5 displayed in the first display area corresponds to a positional relation in the service section among the vehicle C and the events corresponding to the symbols s1 to s5, respectively. In other words, the computer 14 controls the display apparatus 16 so as to display the first display object symbols associating display positions thereof with a position of the vehicle C in the service section and positions of the events in the service section.

In addition, in the first display area, a road surface state in an information object range included in the service information in association with positions in the service section. In the example shown in the figure, with the symbol sc corresponding to the vehicle C as a reference, markings (e.g., paint-out, hatching, dot display, etc.) corresponding to a road surface state are applied to a belt-shaped area extending in the lateral direction in association with positions on the road. In this case, it is decided in advance which road states these markings indicate, whereby a driver can know a road state in the service section and a position of this road state by recognizing a type and a position of a displayed marking.

Next, as one of characteristics of this embodiment, the computer 14 controls the display apparatus 16 so as to further display symbols corresponding to events, which exist in a service section, in a second display area different from the above-mentioned first display area. The first display area displays symbols corresponding to all events which the vehicle C is about to reach, whereas symbols corresponding only to events for which information is provided to a driver (i.e., events for which a driver's attention should be called) are displayed in the second display area. As a premise for performing such display control, based upon a position of an event in a service section and content of the event, the computer 14 calculates display timing for displaying a symbol corresponding to this event in the second display area. In the AHS, in the case in which information on a certain event is provided to a driver, a position for providing the information is short of a distance L from a position of the event. Here, it is considered preferable that this distance L generally satisfies equation 1.

$$L=(V^2-Vt^2)/2\alpha+V\cdot T \qquad \text{[Equation 1]}$$

Here, V is a service upper limit speed (maximum speed in a service section), Vt is a target vehicle speed expected by a service (which varies depending upon an event), $\alpha$ is a usual deceleration of the vehicle C, and T is a response timer of a driver until the driver starts deceleration after being provided with information. In this equation, assuming that a speed of th vehicle C is the service upper limit speed V, the distance L is a sum of a distance the vehicle C travels until the driver provided with information performs a deceleration operation and a distance the vehicle C travels until it reaches the target vehicle speed Vt following this deceleration operation. That is, this distance L indicates a distance required by the driver provided with information to decelerate at the normal deceleration $\alpha$ to the target vehicle speed Vt and reach the position of the event.

In this embodiment in which a plurality of services are provided from one piece of information DSRC22, it is assumed that the computer 14 calculates display timing for respective events based upon the distance L shown in this equation 1. More specifically, display timing of a symbol corresponding to a certain event is calculated as a position in a service section by subtracting the distance L calculated based upon equation 1 from a position of this event in the service section (more precisely, a distance from a base point position).

In addition, as it is understood from equation 1, this distance L has different values depending upon the target vehicle speed Vt. Even if events exist in an identical position, this distance L differs if contents of the events are different. In other words, display timing of a symbol is determined based upon a position of an event in a service section and content of the event. Therefore, an order of arrangement of events corresponding to symbols to be displayed according to this display timing and an order of arrangement of the events in the service section may not always coincide with each other.

Then, the computer 14 performs the following control when the vehicle C reaches a position in the service section corresponding to the calculated display timing (hereinafter simply referred to as "display position"). More specifically, the computer 14 controls the display apparatus 16 so as to display a symbol corresponding to this display timing as a second display object symbol in the second display area in a display size larger than the first display object symbol displayed in the first display area. For example, in the case in which the vehicle C, which has come into the service section, has not passed a display position at all, there is no symbol which is displayed as the second display object symbol. Therefore, in this case, no symbol is displayed at all in the second display area. Then, when the vehicle C has reached a display position closest to the base point position as it travels, a symbol corresponding to this display timing is displayed as the second display object symbol in the second display area.

In addition, when the vehicle C has reached the next display position (i.e., second display position from the base point position) as it further travels in the service section, a symbol corresponding the next display timing is displayed as the second display object symbol in the second display area. However, in this case, the computer 14 controls the display apparatus 16 so as to display symbols corresponding to events as second display object symbols in the second display area until the vehicle C passes the events. Therefore, in the case in which the vehicle C has not passed these events, a symbol corresponding to an event whose display position is the closest to the base point position and a symbol corresponding to an event whose display position is the second closest to the base point position are simultaneously displayed as the second display symbols in the second display area.

Note that, in this case, it is desirable that the computer 14 controls the display apparatus 16 so as to display an array of the second display object symbols linearly. By displaying the array of the second display object symbols in this way, since the symbols to be displayed show a sense of stability of a figurative layout, the cruise assist system has an advantage that it is excellent in viewability for a driver.

Referring to FIG. 4 again, a control state of the computer 14 concerning the second display area will be described in association with a display state of the display apparatus 16. As shown in the figure, in this embodiment, the second display area is specified below the first display area (e.g., about 4/5 of the entire display area), and second display object symbols are displayed in this second display area. Here, in the example shown in this figure, it is assumed that the vehicle C has reached (or passed) a fourth display position counted from the base point position (however, the vehicle C has not passed events corresponding to symbols S1 to S4). In such a case, symbols S1 to S4 corresponding to four events are displayed as second display object symbols in the second display area. In this second display area, these second display object symbols (symbols S1 to S4) are displayed in sizes relatively larger than a size of first display object symbols (symbols s1 to s5) on the first display area side as described above. Such display is more advantageous than the first display object symbols displayed in the first display area in increasing an effect of attracting a driver's attention to the second display object symbols. In addition, in the second display area, the symbols s1 to s4 used in the first display area, characters indicating contents of the events, and backgrounds are combined as the symbols S1 to S4 corresponding to the events. In this way, contents of the events are displayed more in detail in the second display area, whereby an effect is realized in that the contents of the events can be communicated more accurately compared with the case in which the symbols s1 to s4 are simply displayed.

Here, in the case in which there are two or more symbols corresponding to the second display object symbols in the second display area, the computer 14 controls the display apparatus 16 so as to display the respective symbols hierarchically. In this case, the display apparatus 16 is controlled so as to display a hierarchical arrangement from a symbol S_front displayed in the forefront (front side on the paper surface of the figure) to a symbol S_back displayed in the rear end (on the depth side of the paper surface of the figure) associating it with an order of the vehicle C reaching the respective events corresponding to the symbols. In addition, the display apparatus 16 is also controlled so as to display the respective symbols making positions thereof offset from each other. In the example shown in FIG. 4, the symbol S1 concerning the closest event is displayed in the upper right part on the second display area and, from there diagonally in a direction to the lower left part (linearly), the symbols S2 to S4 concerning the subsequent events are displayed hierarchically while making positions thereof offset from each other.

In addition, as shown in FIG. 4, the symbol S4 displayed in the rear end is displayed in a size smaller than a display size of the symbol S1 displayed in the forefront. In other words, the computer 14 controls the display apparatus 16 so as to display the symbol S_back in the rear end in a size smaller than a display size of the symbol S_front in the forefront. In this case, the computer 14 may control the display apparatus 16 so as to display the symbols in sizes continuously reduced from the forefront to the rear end (e.g., 0.8 times or the like as large as a size of a symbol located at the top). Consequently, since the second display object symbols are displayed in reduced sizes in association with an order of the vehicle C reaching the events, a closest event which should be paid attention can be easily understood.

Note that, in this embodiment, the computer 14 specifies an upper limit value of the number of symbols which can be displayed in the second display area. In the case in which the number of symbols corresponding to the second display object symbols is larger than the upper limit value, the computer 14 controls the display apparatus 16 so as to select the symbols equivalent to the upper limit value out of the second display object symbols and display the symbols in order from the one whose display position is closest to a position of the vehicle C. For example, in the case in which the upper limit value is specified as four, even if there are five or more second display object symbols which should be displayed at present, only four symbols selected out of the second display object symbols are displayed in the second display area.

Figure 5:
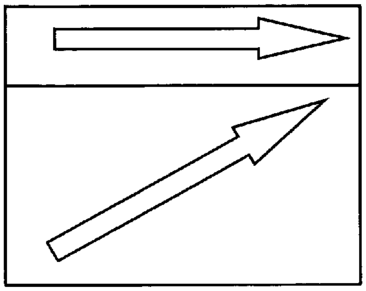
FIG. 5 is a diagram for explaining a figurative balance of first and second display symbols.

In addition, the computer 14 controls the display apparatus 16 to display the first display object symbols and the second display object symbols satisfying a certain rule. FIG. 5 is a diagram for explaining a figurative balance of the first and second display symbols. Here, among the second display object symbols displayed in the second display area, the symbol S_back in the rear end is defined as a start point and the symbol S_front in the forefront is defined as an end point. In this case, in the example shown in FIG. 4, in the second display area, the start point is located in the lower left part of the display area, the symbols are arranged linearly from this start point position diagonally upward, and the end point is located in the upper right part of the display area.

On the other hand, among the symbols displayed in the first display area, the symbol sc corresponding to the vehicle C is defined as a start point and the service end position is defined as an end point. In this case, in the example shown in FIG. 4, in the first display area, the start point is located on the left side of the display area, the symbols are arranged from this start point position to the right side, and the end point is located on the right side of the display area. In this case, if the arrangements of the symbols from the start points to the end points are considered as vectors, in the first and second display areas, the vectors are in a relation in which the vectors coincide with each other in the end point direction, respectively, as shown in FIG. 5, and there is a sense of stability of a figurative layout. This sense of stability has an advantage of giving the driver easiness to see each of the first display area and the second display area.

Figure 6:
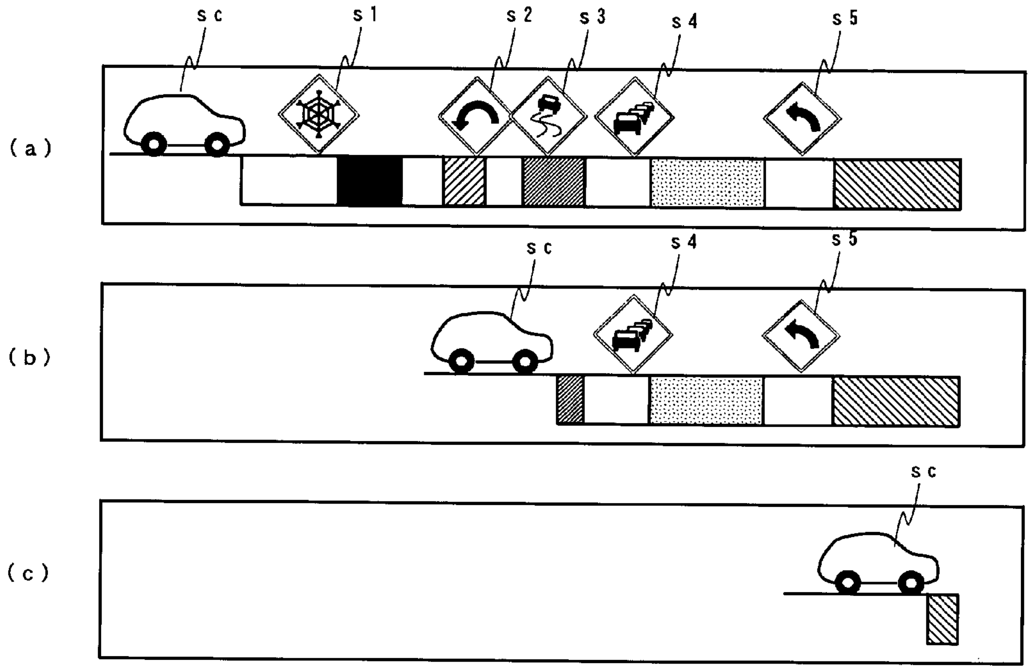
FIG. 6 is an explanatory diagram showing time-series display states in a first display area step by step.

Such a display operation is performed based upon a relation between display timing and a position of the vehicle C, and the vehicle C sequentially passes the events. First, FIG. 6 is an explanatory diagram showing time-series display states in the first display area step by step. In this figure, (a), (b), and (c) indicate, in this order, display states in the case in which the position of the vehicle C in the service section is in the beginning, middle, and the end of the service section, respectively. As it is seen from this figure, the symbol sc associated with the position of the vehicle C in the service section moves from the right to the left in the first display area, and the symbols in parts where this symbols sc has passed are not displayed. That is, as the vehicle C passes, these symbols disappear from the first display area. Therefore, basically, symbols s concerning events which the vehicle C is about to reach are displayed in the first display area. However, the display state of the first display area is not limited to the state shown in FIG. 6, and assuming that the position of the symbol sc corresponding to the vehicle C is fixed, symbols corresponding to events may be displayed while being moved. In addition, if the computer 14 controls the display apparatus 16 so as to display the symbol sc corresponding to the vehicle C, the computer 14 may simply control the display apparatus 16 so as to display this symbol sc while moving it in association with a position in the service section. That is, in this case, it is selective whether or not symbols corresponding to events which the vehicle C has actually passed are brought into the non-display state, and it is sufficient that at least symbols corresponding to events existing between the vehicle C and the end position of the service section are displayed.

Next, a control state of the computer 14 concerning the second display area will be described. For example, in the display state shown in FIG. 4, it is assumed that the vehicle C has passed the event corresponding to the symbol S1. When the vehicle C has passed the event corresponding to the symbol S1, the computer 14 judges that the symbol S1 corresponding to the event which the vehicle C has passed is unnecessary as a second display object symbol. Following this, the symbol S1 disappears from the second display area, and the symbols corresponding to the remaining second display object symbols (in the example shown in FIG. 4, the symbols S2 to S4) are displayed anew with positions and sizes thereof changed. In addition, at this point, in the case in which the next second display object symbol exists, the symbol is displayed in the background.

Then, as the vehicle C passes events or display positions, such controls are performed multiply, and an operation, in which events existing in service section are displayed anew or a symbol currently displayed is brought into the non-display state, is repeated. Then, the computer 14 ends the above-mentioned display of information synchronizing timing with the vehicle C passing the end point of the service section. At this point, the computer 14 may show the driver the end of the service section.

As described above, according to this embodiment, the events existing between the vehicle C and the service section end position are displayed in the first display area. Consequently, the driver can know all the events which can occur as the vehicle C travels by looking at the first display area. Therefore, since the driver can generally know occurrence of the entire events in the service section, the driver can be mentally relaxed. In addition, in this first display area, since the symbols to be displayed is displayed in association with a positional relation in the service section, an overall positional relation of events can be known easily by associating positions where the events can occur and a position of the vehicle C.

In addition, according to this embodiment, based upon the display timing which is determined according to contents and positions of events, events for which a driver's attention should be called (i.e., events whose display positions the vehicle C has reached) are displayed in the second display area. In this case, the second display object symbols displayed in the second display area are displayed in a size larger than the above-mentioned first display object symbols. Since the symbols displayed in this way has high viewability from the driver, the driver's attention to the events can be called effectively. In addition, in this case, for example, the first display object symbols, characters, and backgrounds are included in the symbols displayed in the second display area, whereby information is provided to the driver such that the driver can understand the information well.

Further, in this embodiment, the first and second display object symbols are displayed until the vehicle C passes the symbols. In other words, as the vehicle C passes an event, a symbol corresponding to the event which the vehicle C has passed is not displayed in the first and second display areas. Consequently, likelihood of the driver's confusing an event which the vehicle C has passed with an event which is about to occur can be reduced. In addition, in this embodiment, since symbols to be displayed show a sense of stability as a figurative layout by aligning directions of arrangement of symbols in the first display area and the second display area, there is an effect that viewability of the driver is high.

Figure 7:
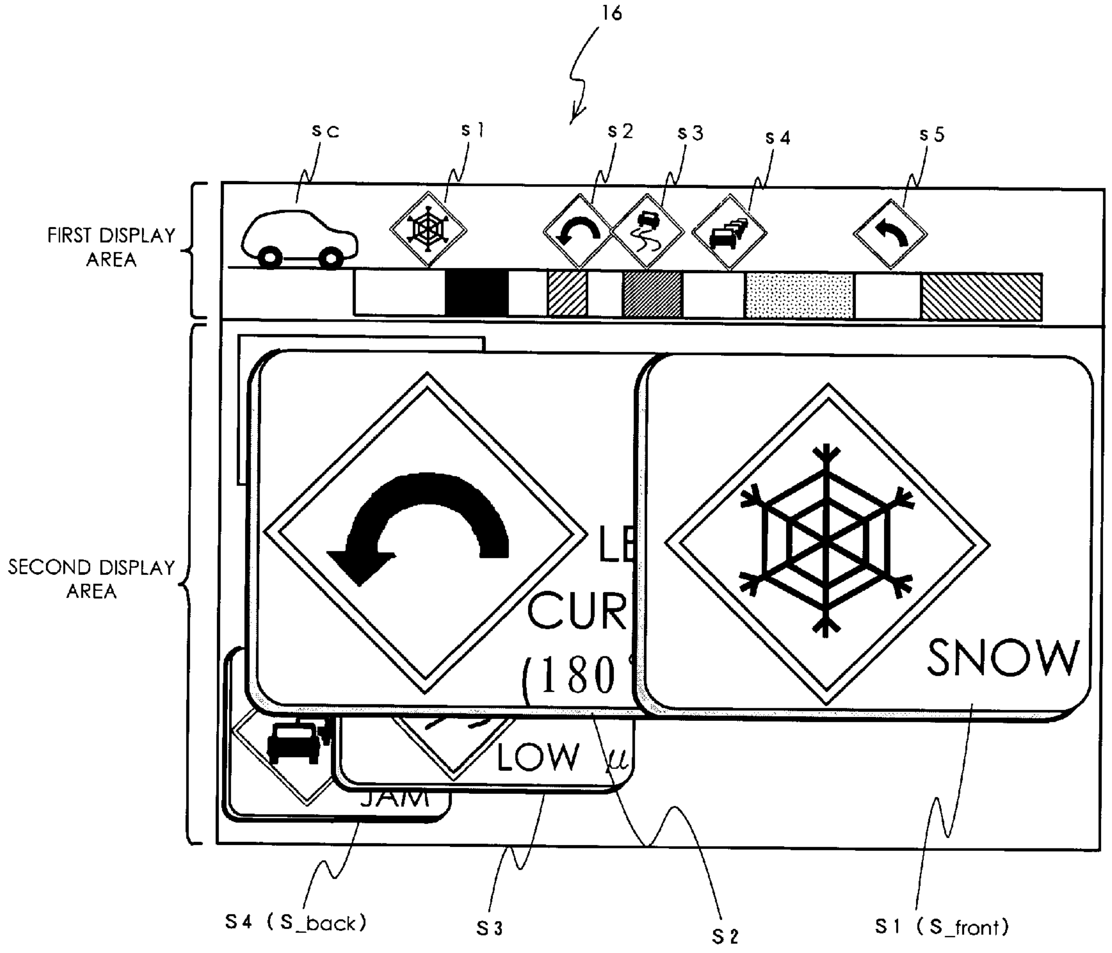
FIG. 7 is an explanatory diagram showing another example of the state in which symbols are displayed in a display apparatus.

Note that, although the second display object symbols are displayed in continuously reduced sizes in the above-mentioned embodiment, for example, display positions for two events may coincide with each other (or may be extremely close to each other). FIG. 7 is an explanatory diagram showing another example of the state in which symbols are displayed in the display apparatus 16. In such a case, the symbol S2 shown in FIG. 4 may be displayed, for example, in a size substantially identical with the size of the symbol S1 and in the same height position as the symbol S1. In this case, although it is likely that a sense of stability of figurative layout is spoiled, since the symbol S2 can be displayed conspicuously so much more for that, the driver can be urged to awaken attention in an equal level for events corresponding to the symbol S1 and the symbol S2, respectively.

Figure 8:
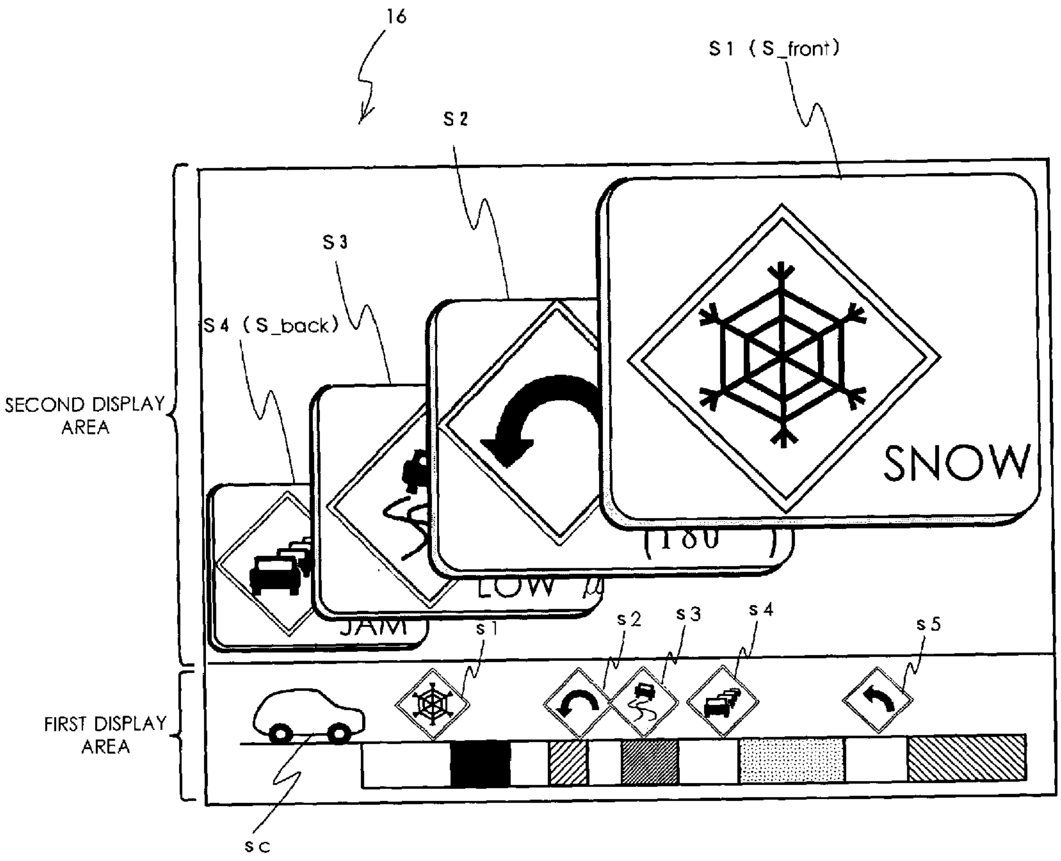
FIG. 8 is an explanatory diagram showing another example of he state in which symbols are displayed in a display apparatus.
Figure 9:
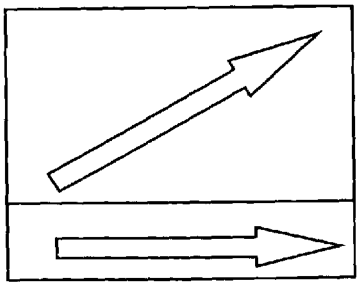
FIG. 9 is a diagram for explaining a figurative balance of the first and second display symbols.

FIG. 8 is an explanatory diagram showing another example of the state in which symbols are displayed in the display apparatus 16. In the above-mentioned embodiment, the first display area is specified to the upper side and the second display area is specified to the lower side. However, the computer 14 may control the display apparatus 16 so as to display the second display area on the upper side and the first display area on the lower side. In the display state shown in the figure, vectors from start points to end points are displayed as coinciding on the start point side in the first and second display areas (see FIG. 9). Even in such a case, since the start point positions are aligned, the first display area and the second display area can show a sense of stability of mutual figurative layout.

Figure 10:
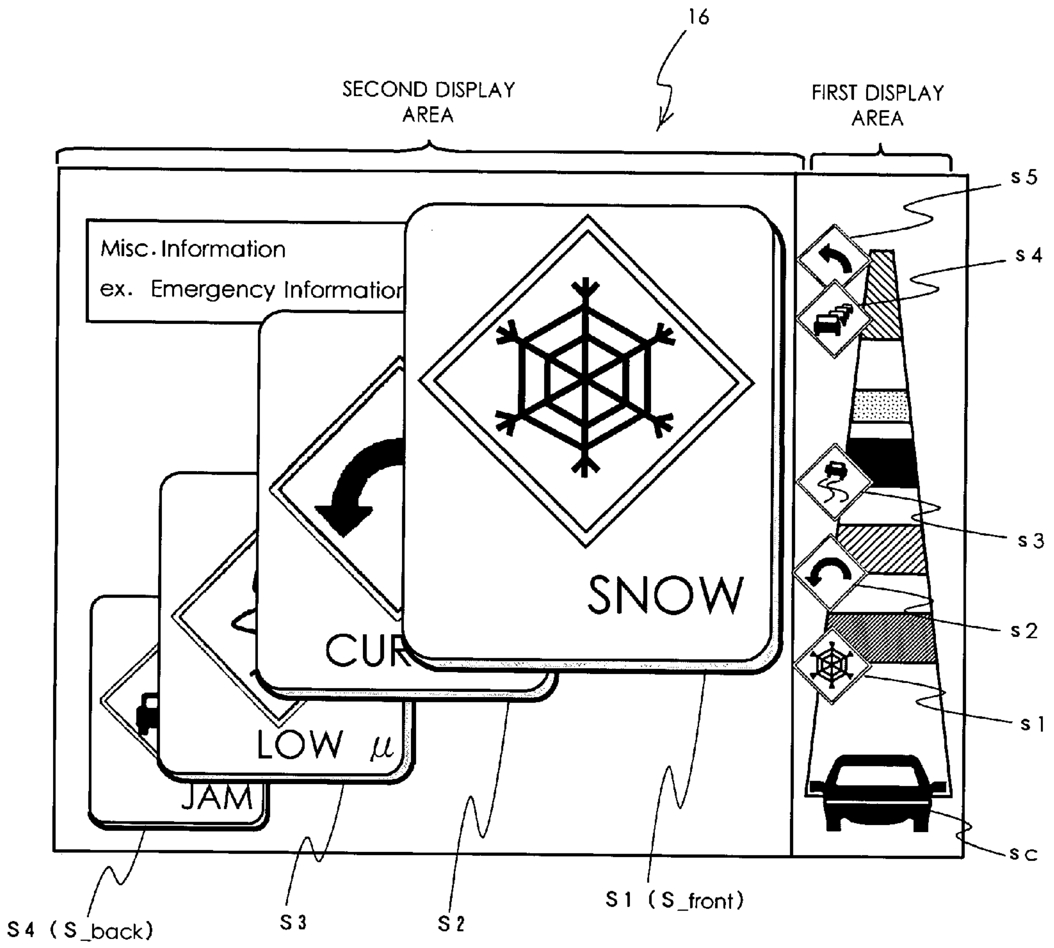
FIG. 10 is an explanatory diagram showing another example of the state in which symbols are displayed in a display apparatus.
Figure 11:
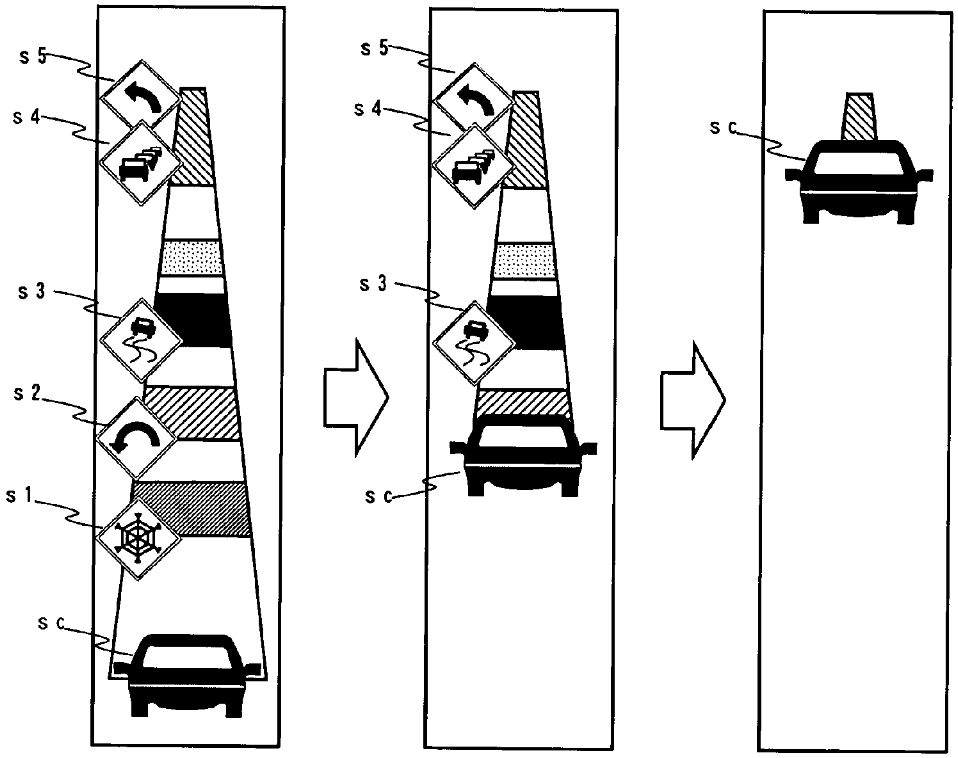
FIG. 11 is an explanatory diagram showing time-series display states of the first display area shown in FIG. 10 step by step.
Figure 12:
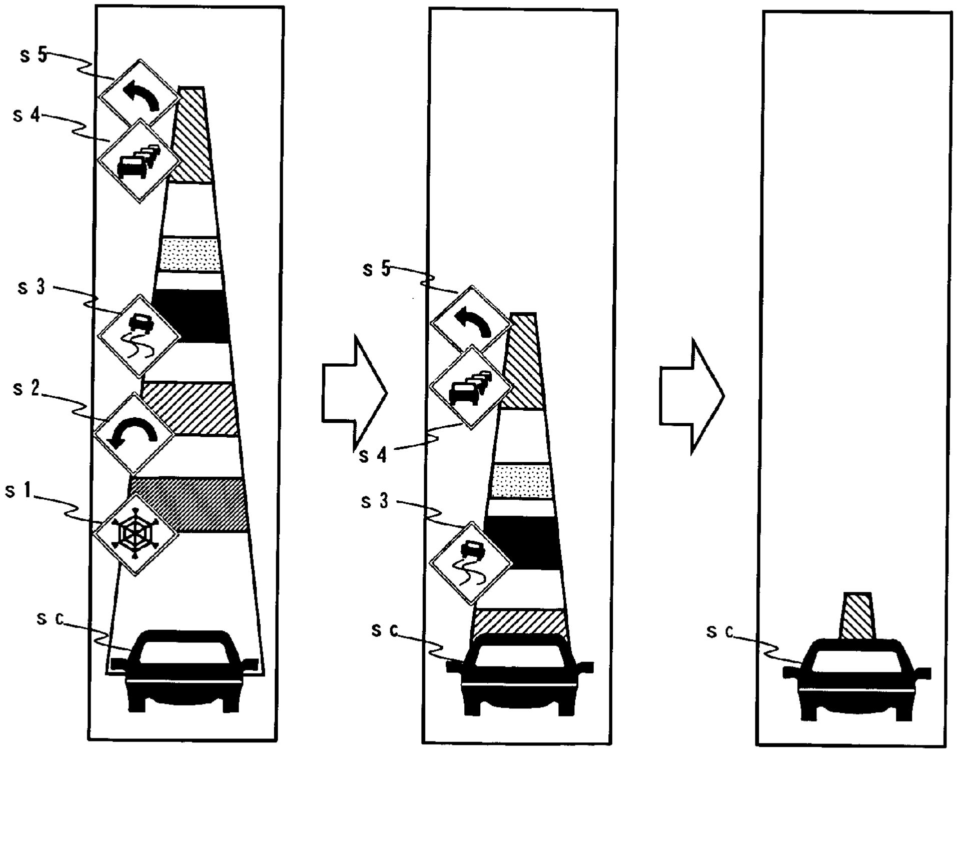
FIG. 12 is an explanatory view showing time-series display states of the first display area shown in FIG. 10 step by step.

Note that, although the first display area and the second display area are displayed vertically in the above-mentioned embodiment, this embodiment is not limited to this. FIG. 10 is an explanatory diagram showing another example of the state in which symbols are displayed in the display apparatus 16. In the example shown in this figure, the first display area is specified to a part on the right side of the display apparatus 16 (e.g., about ⅕ of the entire display apparatus 16), and the second display area is specified to the left side of this first display area. The display state shown in this figure is different from the display state shown in FIG. 4 or FIG. 8 in that the first and second display areas are arranged horizontally. The display state shown in this figure means that, in the first display area, a distance from the vehicle C increases in upper parts of the figure. FIGS. 11 and 12 are explanatory diagrams showing time-series display states of the first display area shown in FIG. 10 step by step. In such a constitution, in order to perform display equivalent to that of FIG. 6, it is sufficient to move a position of the symbol sc corresponding to the vehicle C or move the symbols s1 to s5 of the events in association with the symbol sc corresponding to the vehicle C. Even in such a display state, the same effect as the above-mentioned display states can be realized.

Figure 13:
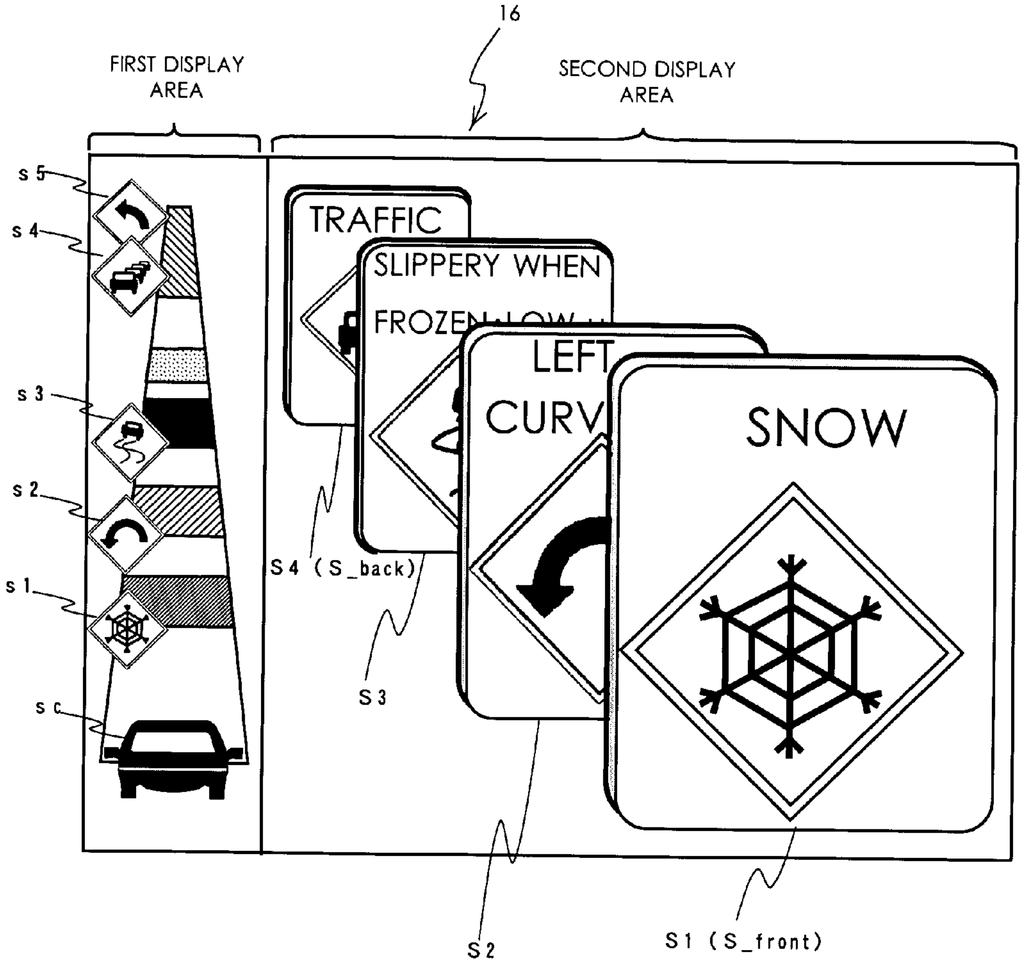
FIG. 13 is an explanatory view showing another example of the state in which symbols are displayed in a display apparatus.

FIG. 13 is an explanatory diagram showing another example of the state in which symbols are displayed in the display apparatus 16. In the example shown in this figure, the first display area is specified to a part on the left side of the display apparatus 16 (e.g., about ⅕ of the entire display apparatus 16), and the second display area is specified to the right side of this first display area. Even in such a display state, the same effect as the above-mentioned display states can be realized. In addition, in the display state shown in the figure, an arrangement of the symbols s1 to s5 displayed in the first display area until the vehicle C reaches them (from the bottom to the top) and a time-series arrangement of the symbols S1 to S4 displayed in the second display area (from the bottom to the top) correspond to each other. In such a display state, a sense of stability of figurative layout can be realized and, since the first display area and the second display area are associated in time series and displayed, a correspondence relation between both the display areas can be known easily.

Note that the symbols shown in the above-mentioned embodiment are an example, and symbols other than them may be used. In addition, the display apparatus 6 may be controlled so as to cause the background of the symbol S_front displayed in the forefront to blink or to display the symbol with a display color different from those of other symbols in the second display area as long as the display urges the driver to awaken attention. In addition, although the display apparatus 16 is controlled so as to display the area for providing the other information to the driver (FIG. 4, upper left part) is displayed in the second display area in this embodiment, it is selective whether or not such an area is provided.

In this way, according to the present invention, events existing between a vehicle and a service section end position are displayed in a first display area. Consequently, a driver can know all events which can occur as the vehicle travels by looking at the first display area. In addition, based upon display timing determined according to contents and positions of the events, events for which the driver's attention should be called are displayed in the second display area. In this case, second display object symbols to be displayed in the second display area are displayed in sizes larger than a size of the above-mentioned first display object symbols. Since the second object symbols displayed in this way is excellent in viewability from the driver, the driver's attention to a closest event can be effectively called.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2002-277706 filed on Sep. 24, 2002 including the specification, drawing and abstract is incorporated herein by reference in its entirety.

What is claimed is:

1. An information display system for displaying service information concerning to at least one of events existing in a service section set for a road received from a road infrastructure, comprising:

a communication apparatus for receiving the service information transmitted from the road infrastructure;

a computer for determining at least one of symbols based upon the received service information, and for controlling a display position and display timing for the determined symbol, each symbol corresponding to each the event existing in the service section; and a display apparatus for displaying the determined symbol in response to an output from the computer, wherein the computer controls the display apparatus so as to display all of the events existing between a position of a vehicle and an end position of the service section by first display object symbols in a first display area, and wherein the computer calculates the display timing based on the position and the contents for each of the events existing in the service section, and controls the display apparatus so as to display a second display object symbol having a display size larger than that of the first display object symbols in a second display area different from the first display area, the symbol as the second display object symbol being displayed when the vehicle reaches to a position corresponding to the calculated display timing for each of the events.

2. An information display system according to claim 1, wherein the computer controls the display apparatus so as to continue to display each of first display object symbol in the first display area until the vehicle passes the event corresponding to each the symbol, and continue to display the symbol as the second display object symbols in the second display area until the vehicle passes the event corresponding to the symbol.

3. An information display system according to claim 1, wherein the computer controls the display apparatus so as to display the display positions of the first display object symbols associated with a position of the vehicle in the service section and position of each the events existing in the service section.

4. An information display system according to claim 1, wherein, when there are two or more symbols to be displayed as the second display object symbol, the computer controls the display apparatus so as to display the respective symbols hierarchically and make the positions offset from each other, and controls the display apparatus so as to display a hierarchical arrangement from a symbol displayed in the forefront to a symbol displayed in the rear end corresponding to an order of the vehicle reaching the respective events corresponding to the symbols.

5. An information display system according to claim 4, wherein the computer controls the display apparatus such that a display size of the symbol displayed in the rear end is smaller than that of the symbol displayed in the forefront.

6. An information display system according to claim 1, wherein the computer specifies an upper limit value of the number of symbols which can be displayed in the second display area, and when the number of the second display object symbols is larger than a predetermined value, the computer controls the display apparatus so as to select the symbols equivalent to the predetermined value in the second display object symbols and display the selected symbols in order from the one whose position in the service section corresponding to the display timing is closest to the position of the vehicle.

7. An information display system according to claim 1, wherein the computer controls the display apparatus such that start points or end points in an arrangement direction from a symbol displayed on the rear end to a symbol displayed in the forefront in the second display area and a time-series arrangement direction of symbols displayed as the first display object symbols in the first display area coincide with each other.

8. An information display system according to claim 1, wherein the computer controls the display apparatus so as to display symbols associating an arrangement direction from a symbol displayed on the rear end to a symbol displayed in the forefront in the second display area and a time-series arrangement direction of symbols displayed as the first display object symbols in the first display area with each other.

9. An information display system for displaying service information concerning to at least one of events existing in a service section set for a road received from a road infrastructure, comprising:

a communication apparatus for receiving the service information transmitted from the road infrastructure;

a computer for determining at least one of symbols based upon the received service information, each symbol corresponding to each event existing in the service section, and for controlling a display position and display timing for the determined symbol; and a display apparatus for displaying the determined symbol in response to an output from the computer, wherein the computer controls the display apparatus so as to display first display object symbols in a first display area, the first display object symbols including the symbols corresponding to all of the events existing between a position of a vehicle and an end position of the service section, and wherein the computer calculates the display timing based on the position and the contents for each the event existing in the service section, and controls the display apparatus so as to hierarchically display a predetermined number of events in an order of earliness of the display timing in the second display area.

10. An information display method for displaying service information for at least one of events existing in a service section set for a road received from a road infrastructure, comprising:

a first step of displaying all of the events existing between a position of a vehicle and an end position of the service section;

a second step of calculating display timing for displaying at least one of symbols in a second display area different from the first display area based upon the position and the contents for each of the events existing in the service section, each symbol corresponding to each the event; and a third step of displaying the determined symbol corresponding to the display timing as second display object symbol having a display size larger than that of the first display object symbol in the second display area, when the vehicle reaches to a position corresponding to the calculated display timing for each of the events.

11. An information display method according to claim 10, wherein in the first step, the symbol as the first display object symbol is displayed in the first display area until the vehicle passes the event corresponding to the symbol, and in third step, the symbol as the second display object symbol is displayed in the second display area until the vehicle passes the event corresponding to the symbol.

12. An information display method according to claim 10, wherein in the first step, the display positions of the first display object symbols are associated with a position of the vehicle in the service section and positions of the events existing in the service section.

13. An information display method according to claim 10, wherein, in the third step, when there are two or more symbols as the second display object symbols, the respective symbols are hierarchically displayed with a positional offset, and a hierarchical arrangement from the symbol displayed in the forefront to the symbol displayed in the rear end corresponding to an order of the vehicle reaching the respective events corresponding to the symbols.

* * * * *